(12) United States Patent
Summers et al.

(10) Patent No.: US 6,738,225 B1
(45) Date of Patent: May 18, 2004

(54) ALIGNMENT OF SLIDERS WITH A DIMPLE POST IN HEAD GIMBAL ASSEMBLIES

(75) Inventors: Robert Summers, Temecula, CA (US); Daniel Vera, Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 51 days.

(21) Appl. No.: 10/199,280

(22) Filed: Jul. 18, 2002

Related U.S. Application Data

(60) Division of application No. 09/697,880, filed on Oct. 26, 2000, now abandoned, which is a continuation-in-part of application No. 09/310,015, filed on May 11, 1999, now Pat. No. 6,212,760.
(60) Provisional application No. 60/131,619, filed on Apr. 28, 1999.

(51) Int. Cl.$^7$ .............................................. G11B 5/48
(52) U.S. Cl. ................... 360/245.2; 360/245.3; 360/245.1

(58) Field of Search ........................... 360/245.2, 245.3, 360/245.1; 29/603.06

(56) References Cited

U.S. PATENT DOCUMENTS

| | | | | |
|---|---|---|---|---|
| 4,633,451 A | * | 12/1986 | Ahn et al. ..................... | 369/14 |
| 4,866,836 A | * | 9/1989 | Von Brandt et al. ..... | 29/603.06 |
| 5,758,406 A | * | 6/1998 | Hunsaker et al. ......... | 29/603.06 |
| 6,212,760 B1 | * | 4/2001 | Summers et al. ........ | 29/603.06 |
| 6,469,870 B1 | * | 10/2002 | Summers et al. ........ | 360/245.3 |

* cited by examiner

*Primary Examiner*—Allen Cao
(74) *Attorney, Agent, or Firm*—Louis J. Bachand

(57) ABSTRACT

Problems aligning a slider with a dimple post in manufacture of head gimbal assemblies for disk drive suspensions are obviated by defining left and right optically readable indicia that are visible when the dimple post is not and that serve as a reference for positioning apparatus rather then the dimple post itself.

5 Claims, 5 Drawing Sheets

FIG. 2
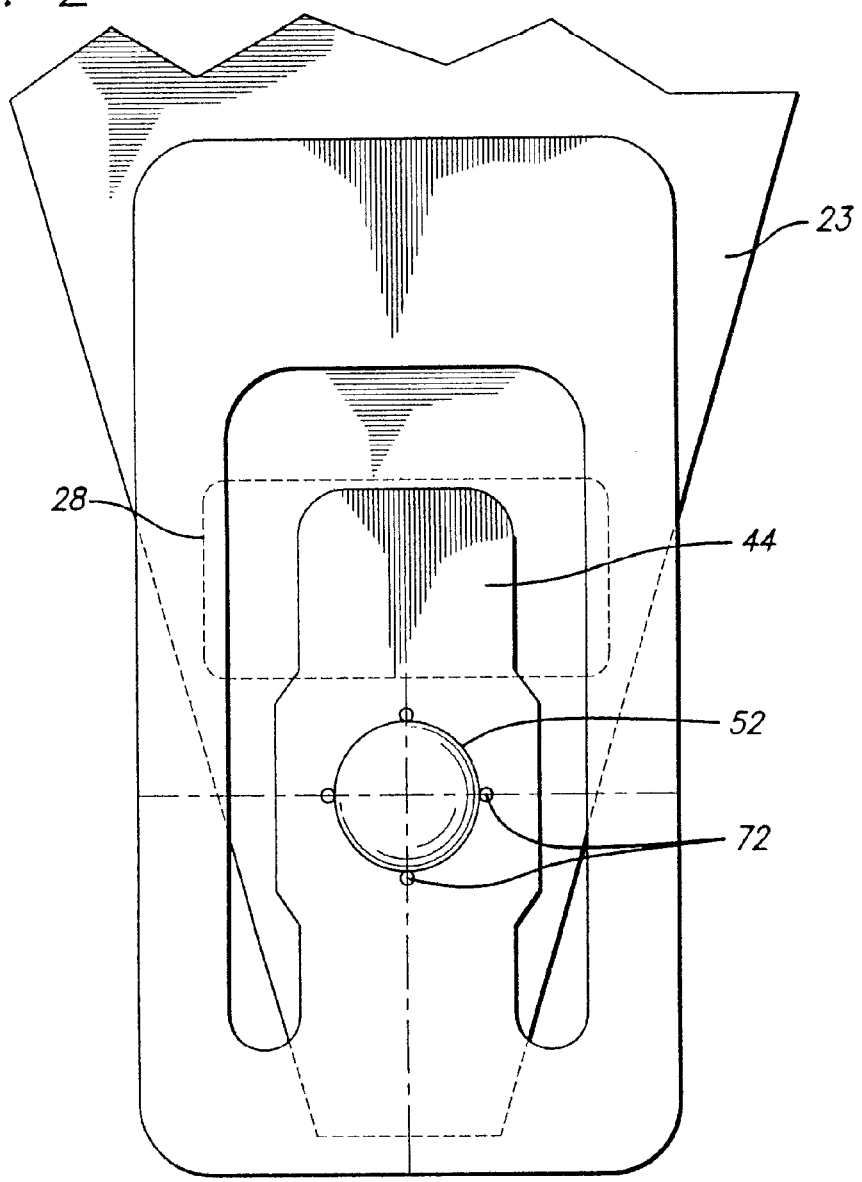
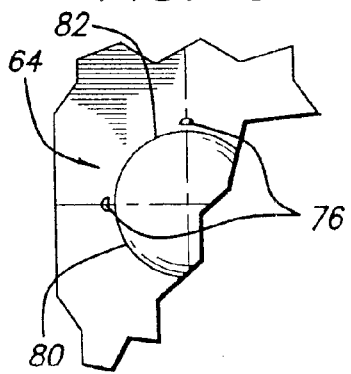
FIG. 6
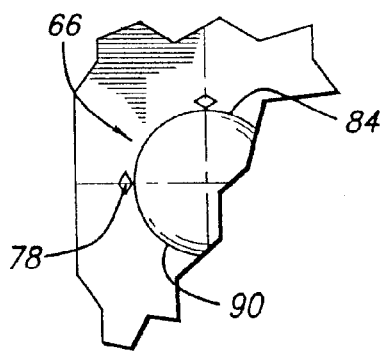
FIG. 7
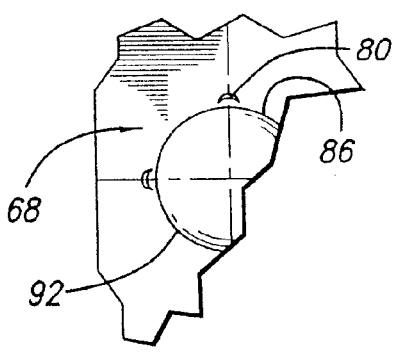
FIG. 8

ALIGNMENT OF SLIDERS WITH A DIMPLE POST IN HEAD GIMBAL ASSEMBLIES

REFERENCE TO RELATED APPLICATIONS

This application is division of our U.S. application Ser. No. 09/697,880 filed Oct. 26, 2000, now abandoned, which in turn is a continuation in part of U.S. application Ser. No. 09/310,015 filed May 11, 1999, now U.S. Pat. No. 6,212,760 issued Apr. 10, 2001, which application claims the benefit of U.S. Provisional Application Ser. No. 60/131,619 filed Apr. 28, 1999.

BACKGROUND OF THE INVENTION

1. Field of the Invention

This invention relates to manufacture of head gimbal assemblies, known as HGAs. More particularly, the invention relates to manufactures and manufacturing steps that simplify and make more accurate and less time-consuming the juxtaposing of the slider with the dimple when mounting the slider to the flexure tongue. The invention substitutes added optically readable indicia for the outlines of the dimple as the locating criteria for the slider, thus ensuring accurate placement of the slider every time.

2. Related Art

In the manufacture of suspensions comprising a load beam, a flexure attached to the load beam and having a tongue, and a slider, mounted for gimbaling movement around a dimple defined by the flexure tongue or the load beam rigid portion, the positioning of the slider by automatic equipment is essential to efficient manufacture. A misplaced slider, that is a slider that is not properly aligned with reference to the dimple, will not gimbal properly or predictably and is a costly defect that reduces manufacturing yield. Taking additional time to properly place the slider increases costs in a very cost conscience industry.

SUMMARY OF THE INVENTION

This application refers to sliders as the mounted element. The term slider herein is used to encompass not only the slider itself, a typically ceramic body designed to fly over the rotating disk in a disk drive, but also to include the read-write head carried within the slider body and connected to the device electronics.

The need for increased accuracy in positioning of sliders must be met at no greater expenditure of manufacturing time. This can be achieved by the use of automatic positioning apparatus using optical reading to locate the correct position. Presently available optical readers, known per se, cannot, however, read with certainty the location of the dimple because the dimple, being an upset or etch formed boss, lacks clear delineation at its junction with the surrounding wall of the flexure tongue or load beam rigid portion. That is, there is not a sufficiently sharp, or uniformly distributed, target for the optical reader to use as a marker for positioning the slider relative to the dimple.

It is an object, therefore, of the present invention to provide markers of such sharpness and uniformity of distribution that positioning equipment can read and position the slider with reference to them, as opposed to the dimple, with increased accuracy, better speed and fewer defects. It is a further object to provide a system of optically readable indicia, typically geometric shapes, arranged in a pattern useful in the invention method. It is a further object to provide a series of such indicia arranged in such proximity and uniformity of pattern relative to the dimple as to be useful as a proxy for the dimple in locating the slider properly on the flexure tongue. It is a further object to provide an etched dimple in the form of a dimple post that is so small as to be normally hidden below the flexure tongue. It is a further object to provide optical readable indicia laterally adjacent the dimple post to enable optical reading of the indicia although the dimple post is hidden from view, and thus to enable the mounting of the slider with great accuracy.

These and other objects of the invention, to become apparent hereinafter, are realized in a head gimbal assembly of a load beam comprising a wall, a flexure attached to said load beam and having a tongue, and a slider attached to a first side of the flexure tongue, the load beam defining a dimple comprising a solid post extending normal to the load beam wall and positioned, sized and shaped to allow gimballing movement of the slider by contact with a second side of the flexure tongue, the dimple post being hidden from view from the flexure tongue first side, and optically readable indicia formed in the load beam wall laterally of the dimple sufficiently to be visible from the first side of the flexure tongue for precisely locating the slider opposite the dimple post be reference to the optically readable indicia rather than the dimple post.

In typical embodiments, the load beam is locally etched to define the dimple and flexure tongue is locally narrowed opposite the indicia to facilitate location of the indicia immediately adjacent the dimple post while maintaining the indicia visible from the flexure tongue first side, the dimple post is cylindrical, and the optical readable indicia comprise left and right hand holes on a common axis with the dimple post, the flexure tongue having a dog-bone shape to expose the optically readable indicia.

In its method aspects the invention contemplates the method of mounting sliders onto load beams of flexure tongues in position opposite the dimple in a head gimbal assembly comprising a load beam, a flexure having a tongue and a slider, and wherein the load beam defines a dimple as an upstanding post smaller in width than the flexure tongue, that includes marking the situs of the dimple with optically readable indicia comprising left and right load beams holes laterally spaced from the dimple post sufficiently to be visible when the dimple post is not visible, and guiding placement of the slider on the flexure tongue with reference to the optically readable indicia rather than the dimple.

In this and like embodiments, also, there is included forming the dimple post by etching the load beam, and shaping the flexure tongue to expose the optically readable indicia for reading.

BRIEF DESCRIPTION OF THE DRAWINGS

The invention will be further described as to an illustrative embodiment in conjunction with the attached drawings in which:

FIG. 2 is a plan view of the invention head gimbal assembly in which the dimple is formed on the flexure tongue;

FIGS. 6, 7 and 8 are fragmentary views of particular optical indicia shapes, patterns and distributions.

DETAILED DESCRIPTION

The invention uses optical reading, or vision, equipment known per se and not forming part of the invention to assist in the placement of the sliders on the flexure tongues. Use of such equipment is enhanced in the invention by providing more easily and more accurately read indicia that the line formed at the boundary of the dimple and the surrounding flexure tongue or load beam wall.

Figure 1:
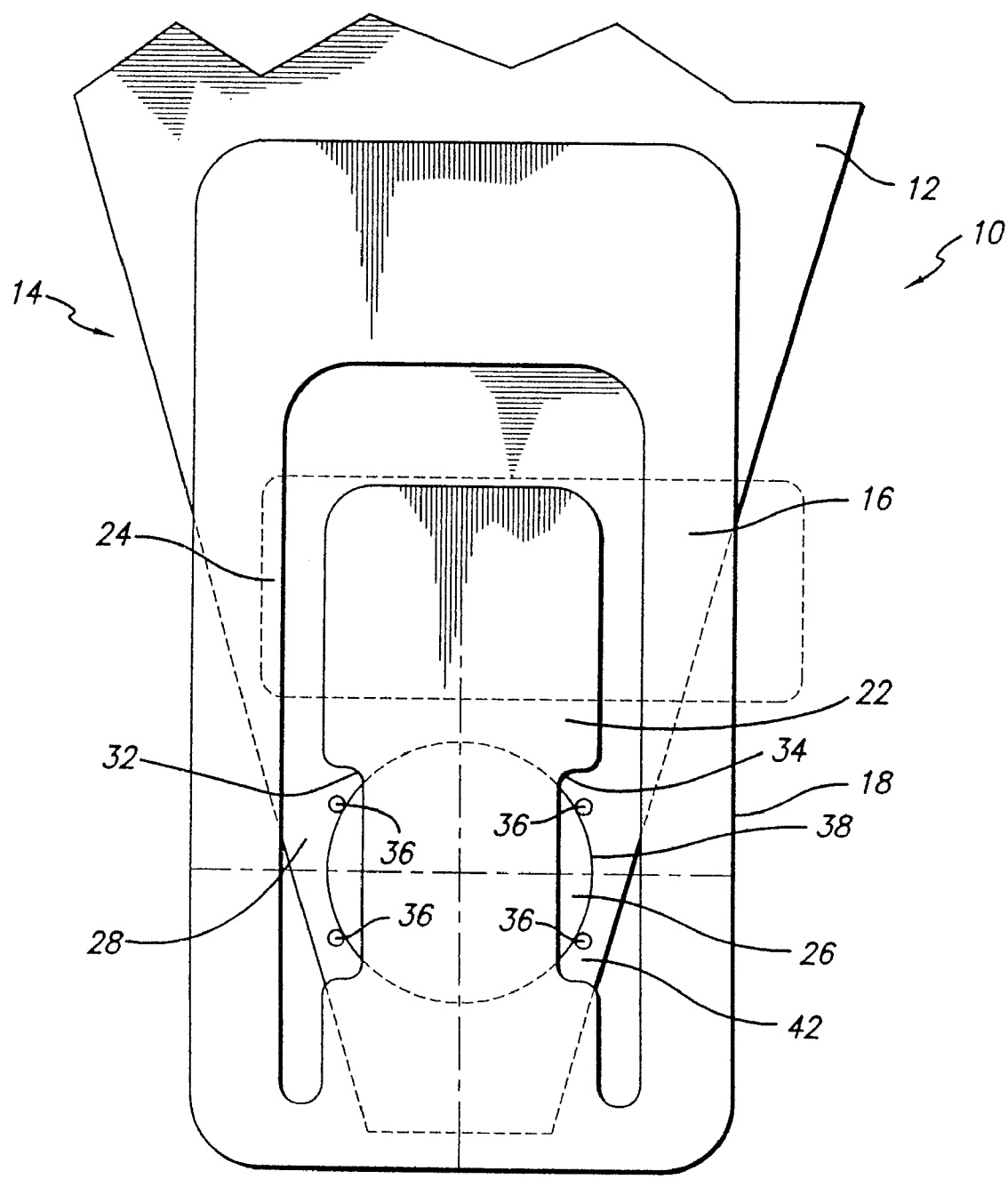
FIG. 1 is a plan view of the invention head gimbal assembly in which the dimple is formed on the load beam.

With reference to FIG. 1, a head gimbal assembly 10 is shown to include the rigid portion 12 of load beam 14 (the base portion, the spring portion and the actuator for shifting the load beam not being shown). Flexure 16 is attached as by welding to the load beam portion 12. Flexure 16 comprises a frame 18 and a cantilevered tongue 22. A slider 24, shown in phantom, is to be attached to the flexure tongue 22 at a location that places the slider 24 precisely opposite the dimple 26 (formed on the load beam portion 12 in this embodiment). Thus placed the slider 24 will be able to gimbal about the dimple 26 with the flexure tongue 22.

In the FIG. 1 embodiment, the flexure tongue 22 is particularly positioned, sized and shaped to expose the invention optically readable indicia 28 by relieving the tongue along its length at laterally opposed locations 32, 34 to provide a dog-bone shape as shown rather than the more usual rectangular shape. Any other shape providing the flexure tongue function and exposure for reading of the indicia 28 will be useful as well.

The indicia 28 are shown to be a series of circular shaped holes 36 that are typically etched into the load beam around the dimple 26. Hereinafter described indicia shapes and patterns can also be used in this embodiment. The holes 36, like the other indicia of the invention, are sharp-edged, at least more sharp than the edge or boundary line 38 between the dimple 26 and the surrounding wall 42 of the load beam portion 12, and preferably so sharp that the reading equipment can readily identify the marker provided by the holes 36. The pattern of holes 36 is one of uniform circumferential distribution based on the corners of an imaginary rectangle centered on the axes of the dimple 26.

In FIGS. 2–8 a series of embodiments are shown having in common the presence of the dimple 52 on the flexure tongue 44, as opposed to the load beam portion 23. The shape, size, location and sharpness of edge characteristics of the indicia 28 in the first embodiment find their counterparts in the indicia 56 in these embodiments.

Figure 3:
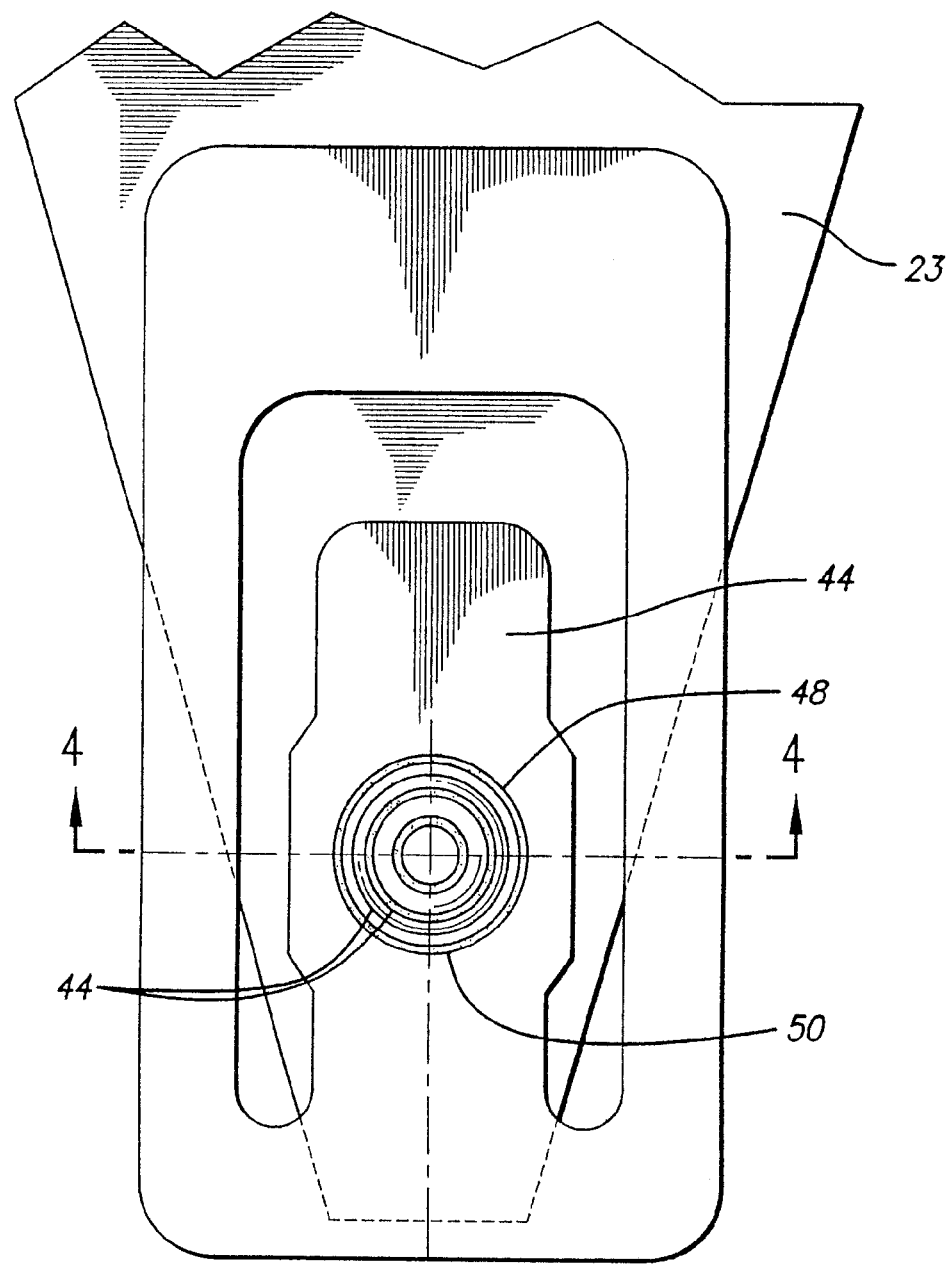
FIG. 3 is a plan view of the invention head gimbal assembly in which the flexure dimple has a series of annular rings forming the optical indicia.
Figure 4:
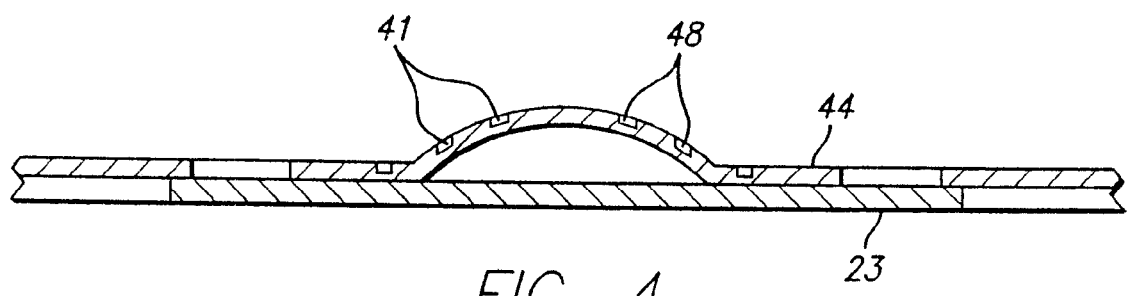
FIG. 4 is a view taken on line 4—4 in FIG. 1.
Figure 5:
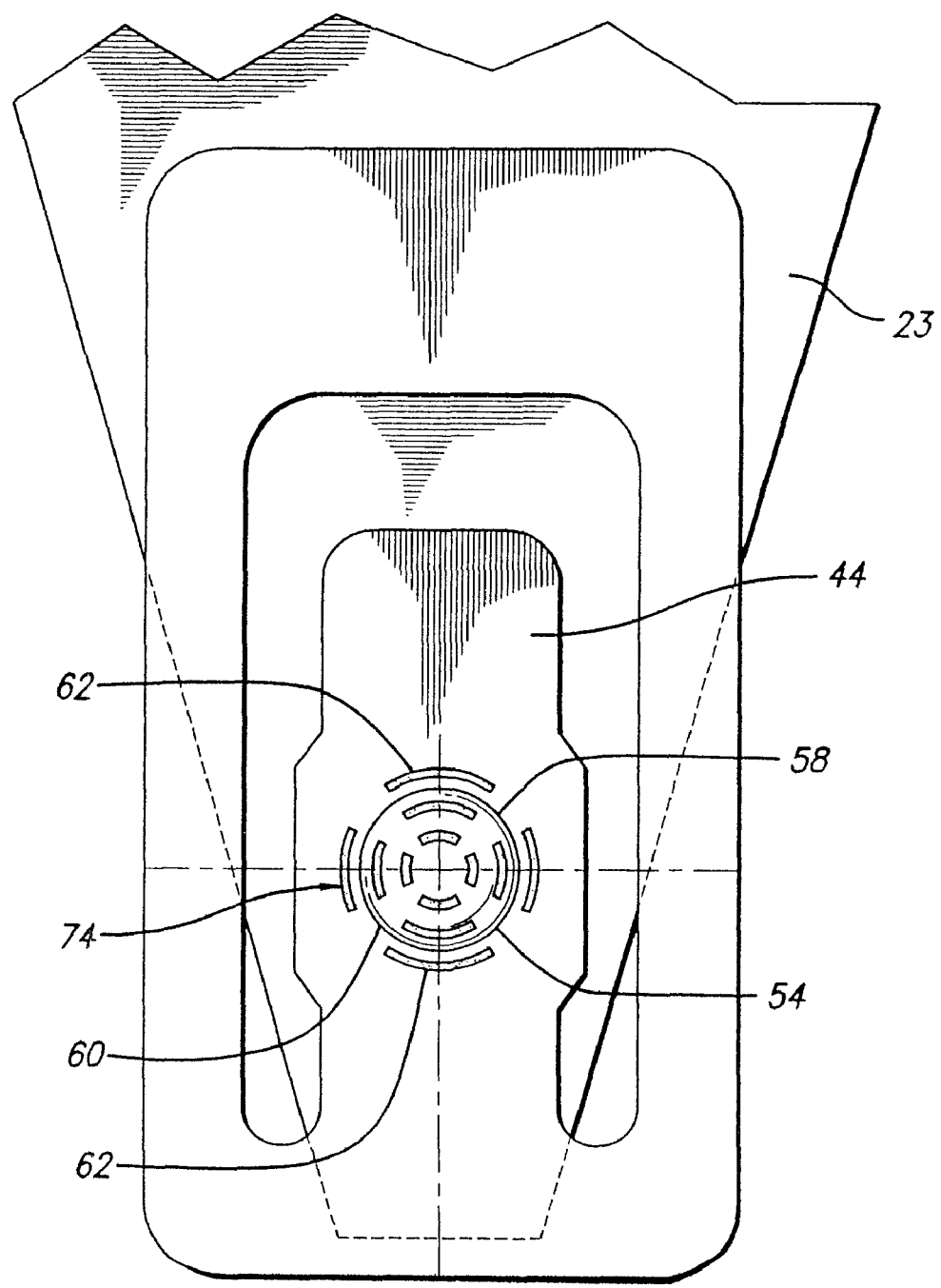
FIG. 5 is a view like FIG. 3, having a different pattern of optical indicia.

Thus, in FIG. 2, a series of circular holes 72 arranged at a spacing of 90° is provided as an effective target for the vision equipment to accurately locate and position the slider 28. In FIGS. 3 and 4 an axially extended, stepped series 44 of annular slots 46 are provided formed on the dimple 48 within the periphery 50 of the dimple. In FIG. 5, an axially extended, stepped series 74 or interrupted annular slots or arcuate slots 54 are provided formed on the dimple 58 partially within the periphery 60 of the dimple, and partially without, as at 62.

In FIGS. 6, 7 and 8, a 90° distribution of indicia is shown at 64, 66, and 68, comprising respectively, indicia 76 comprising in longitudinal cross-section semi-circles, indicia 78 comprising in longitudinal cross-section diamonds, and indicia 80 comprising arcuate holes, all uniformly spaced around the respective peripheries 82, 84 and 86 of the dimples 88, 90 and 92.

In the invention method, slider 24 is mounted onto the load beam portion 12 or flexure tongue 22 in position opposite, e.g. the dimple 28, in the head gimbal assembly 10, marking the situs of the dimple with optically readable indicia, e.g. 28, and guiding placement of the slider with reference to the optically readable indicia rather than the dimple.

Figure 9:
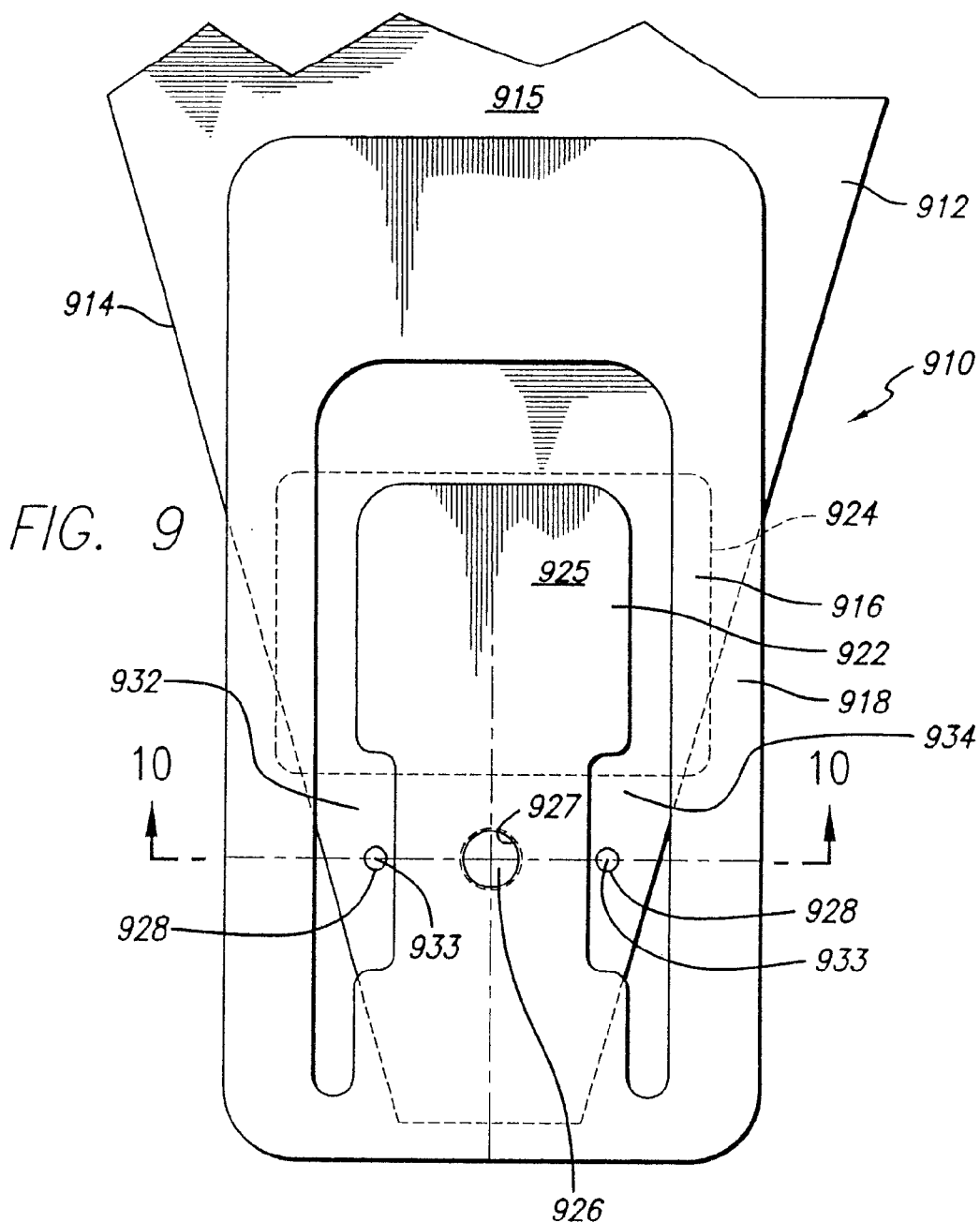
FIG. 9 is a view like FIG. 1 of an alternate embodiment.
Figure 10:
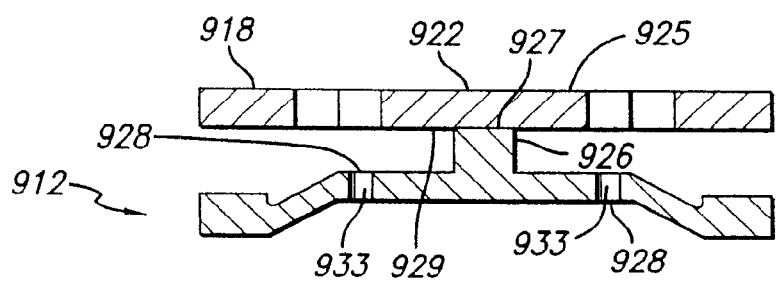
FIG. 10 is a view taken on line 10—10 in FIG. 9

With reference now to FIGS. 9 and 10, head gimbal assembly 910 includes rigid portion 912 of the load beam 914. Load beam rigid portion 912 comprises generally planar wall 915. Flexure 916 is suitably weld or glue attached to the load beam portion 912. Flexure 916 comprises a frame 918 and a cantilevered tongue 922. Slider 924 (shown in phantom) is attached to a first side 925 of the flexure tongue 922, at a location to be precisely opposite the dimple post 926. Dimple post 926 is formed by etching the load beam portion 912 from a suitable thickness roughly equal to the indicated height of the dimple post to form the load beam wall 915 and leave the post upstanding as shown and suitably circularly or polygonally cylindrical, solid, and with a flat or somewhat curved top surface 927 that engages in gimballing relation the second side 929 of the flexure tongue 922. As with the previous dimple 26, the solid post dimple 926 extends normal to the load beam wall 915 and is positioned, sized and shaped as shown to allow gimballing movement of the slider by contact with the opposing, second side 929 of the flexure tongue 922.

As shown, dimple post 926 is hidden from view from a vantage point on the flexure tongue first side 925. There are, however, in accordance with the invention, optically readable indicia 928 formed in the load beam wall 915 laterally of the dimple post 926 sufficiently to be visible from the first side 925 of the flexure tongue 922 for precisely locating the slider 924 opposite the dimple post by reference to the optically readable indicia rather than the dimple post.

In typical embodiments, the flexure tongue 922 is locally narrowed at 932, 934 generally opposite the indicia 928 so to provide the tongue with a sort of dog-bone shape as shown, that will facilitate placement of the indicia more immediately adjacent the dimple post 926 while maintaining the indicia visible from the tongue first side 925.

The optically readable indicia 928 comprise left and right hand through or partially through holes 933 on a common axis A—A with the dimple post 926.

In its method aspects the invention of FIGS. 9 and 10 mounts a slider 924 onto the flexure tongue 922 in proper position opposite the dimple post 926 wherein the dimple post, etched from the load beam wall 915 is smaller in width than the flexure tongue, even with special shaping of the flexure tongue, by marking the situs of the dimple post with optically readable indicia comprising left and right load beam holes 933 laterally spaced from the dimple post sufficiently to be visible when the dimple post is not visible, the guiding placement of the slider on the flexure tongue with reference to the optically readable indicia rather than the dimple.

The invention thus provides markers of such sharpness and uniformity of distribution that positioning equipment can read and position the slider with reference to them, as opposed to the dimple with increased accuracy, better speed and fewer defects using a system of optically readable indicia, typically geometric shapes, arranged in a pattern useful in the invention method. The provided series of such indicia arranged in such proximity and uniformity of pattern relative to the dimple are useful as a proxy for the dimple in locating the slider properly on the flexure tongue.

We claim:

1. A head gimbal assembly of a load beam comprising a wall, a flexure attached to said load beam and having a tongue, and a slider attached to a first side of said flexure tongue, said load beam defining a dimple comprising a solid post extending normal to the load beam wall and positioned, sized and shaped to allow gimballing movement of said slider by contact with a second side of said flexure tongue, said dimple post being hidden from view from said flexure tongue first side, and optically readable indicia formed in said load beam wall laterally of said dimple sufficiently to be visible from said first side of said flexure tongue for precisely locating said slider opposite said dimple post by reference to said optically readable indicia rather than said dimple post.

2. The head gimbal assembly according to claim 1, in which said load beam is locally etched to define said dimple.

3. The head gimbal assembly according to claim 1, in which said flexure tongue is locally narrowed opposite said indicia to facilitate location of said indicia immediately adjacent said dimple post while maintaining said indicia visible from said flexure tongue first side.

4. The head gimbal assembly according to claim 1, in which said dimple post is cylindrical.

5. The head gimbal assembly according to claim 4, in which said optically readable indicia comprise left and right hand holes on a common axis with said dimple post, said flexure tongue having a dog-bone shape to expose said optically readable indicia.

* * * * *